(12) United States Patent
Kobayashi

(10) Patent No.: US 11,154,936 B2
(45) Date of Patent: Oct. 26, 2021

(54) CUTTING TOOL AND METHOD OF MANUFACTURING MACHINED PRODUCT USING THEM

(71) Applicant: KYOCERA CORPORATION, Kyoto (JP)

(72) Inventor: Youji Kobayashi, Yasu (JP)

(73) Assignee: KYOCERA CORPORATION, Kyoto (JP)

( * ) Notice: Subject to any disclaimer, the term of this patent is extended or adjusted under 35 U.S.C. 154(b) by 117 days.

(21) Appl. No.: 16/337,464

(22) PCT Filed: Sep. 26, 2017

(86) PCT No.: PCT/JP2017/034653
§ 371 (c)(1),
(2) Date: Mar. 28, 2019

(87) PCT Pub. No.: WO2018/062133
PCT Pub. Date: Apr. 5, 2018

(65) Prior Publication Data
US 2019/0232379 A1    Aug. 1, 2019

(30) Foreign Application Priority Data
Sep. 29, 2016    (JP) .............................. JP2016-190486

(51) Int. Cl.
*B23B 27/10*    (2006.01)
*B23B 29/12*    (2006.01)
*B23B 51/06*    (2006.01)

(52) U.S. Cl.
CPC .............. *B23B 27/10* (2013.01); *B23B 29/12* (2013.01); *B23B 51/06* (2013.01); *B23B 2250/12* (2013.01)

(58) Field of Classification Search
CPC ......................... B23B 27/10; B23B 2260/124
See application file for complete search history.

(56) References Cited

U.S. PATENT DOCUMENTS

| | | | | |
|---|---|---|---|---|
| 2,267,923 A | * | 12/1941 | Johnson .................. | F16B 33/02 285/334 |
| 4,244,607 A | * | 1/1981 | Blose .................. | E21B 17/0423 285/334 |
| 4,588,213 A | * | 5/1986 | Bollfrass ............. | E21B 17/0423 277/616 |
| 4,730,857 A | * | 3/1988 | Schwind ............. | E21B 17/0423 285/390 |

(Continued)

FOREIGN PATENT DOCUMENTS

| | | |
|---|---|---|
| CN | 205605596 U | 9/2016 |
| JP | S5186821 A | 7/1976 |

(Continued)

*Primary Examiner* — Alan Snyder
(74) *Attorney, Agent, or Firm* — Viering, Jentschura & Partner mbB

(57) ABSTRACT

A cutting tool may include a flow path and a sealing part. The flow path may include an inflow port and an outflow port. The sealing part may be located continuously with the flow path and may include a male screw and a female screw. Screw threads in the male screw may include a first screw thread. Screw grooves in the female screw may include a first screw groove. A top portion of the first screw thread may be in contact with a bottom portion of the first screw groove.

20 Claims, 8 Drawing Sheets

(56) References Cited

U.S. PATENT DOCUMENTS

| | | | |
|---|---|---|---|
| 6,062,263 A | | 5/2000 | Donovan et al. |
| 6,299,388 B1* | | 10/2001 | Slabe ................ B23B 27/10 |
| | | | 407/100 |
| 2014/0030033 A1 | | 1/2014 | Luik et al. |
| 2016/0067786 A1* | | 3/2016 | Thelin ............... B23B 27/007 |
| | | | 407/11 |
| 2016/0201711 A1 | | 7/2016 | Lard |
| 2016/0236281 A1 | | 8/2016 | Kitagawa |
| 2017/0043407 A1* | | 2/2017 | Ogata ................ B23B 27/10 |

FOREIGN PATENT DOCUMENTS

| | | |
|---|---|---|
| JP | H09210285 A | 8/1997 |
| JP | 2000120635 A | 4/2000 |
| JP | 2008032051 A | 2/2008 |
| JP | 2014509563 A | 4/2014 |
| WO | 2015056496 A1 | 4/2015 |

\* cited by examiner

CUTTING TOOL AND METHOD OF MANUFACTURING MACHINED PRODUCT USING THEM

CROSS-REFERENCE TO RELATED APPLICATIONS

This application is a national stage entry according to 35 U.S.C. 371 of PCT Application No. PCT/JP2017/034653 filed on Sep. 26, 2017, which claims priority to Japanese Application No. 2016-190486 filed on Sep. 29, 2016, which are entirely incorporated herein by reference.

TECHNICAL FIELD

The present disclosure relates to a cutting tool and a method of manufacturing a machined product using the cutting tool.

BACKGROUND

Various cutting tools with a coolant supply mechanism have been proposed. A cutting tool, whose portion being continuous with a flow path located inside a holder is closed by a screw or the like, has also been proposed as discussed in Japanese Unexamined Patent Publication No. 2014-509563 (Patent document 1).

SUMMARY

In a non-limiting aspect of the present disclosure, a cutting tool may include a flow path and a sealing part. The flow path may include an inflow port and an outflow port. The sealing part may be located continuously with the flow path and may include a male screw and a female screw. Screw threads in the male screw may include a first screw thread. Screw grooves in the female screw may include a first screw groove. A top portion of the first screw thread may be in contact with a bottom portion of the first screw groove.

In a non-limiting aspect of the present disclosure, a method of manufacturing a machined product may include preparing a workpiece and a cutting tool in the present disclosure described above, rotating the workpiece or the cutting tool, causing the workpiece and the cutting tool to come into contact with each other, and keeping the workpiece and the cutting tool away from each other.

DETAILED DESCRIPTION

<Cutting Tools>

Figure 1:
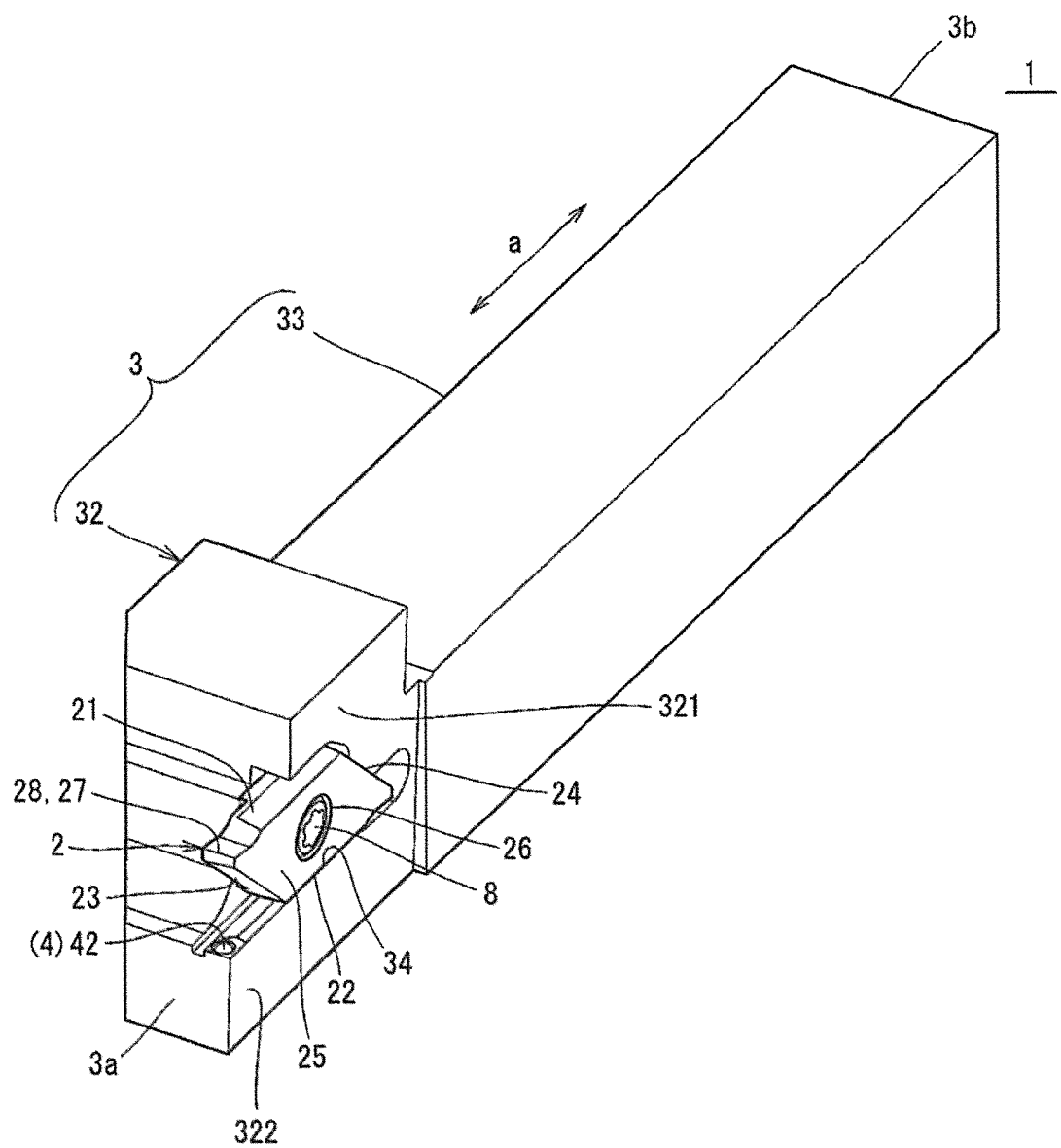
FIG. 1 is a perspective view illustrating a cutting tool in a non-limiting aspect of the present disclosure.

The cutting tools in various non-limiting aspects of the present disclosure are described below with reference to the drawings. The term "cutting tools" denotes a member that serves for a cutting process by being attached to a tool machine. Therefore, examples of the cutting tools in the present disclosure may include a holder alone besides a structure, such as a drill, in which a cutting edge is integrated with a main body, and a structure including an insert and a holder. A part of the structure, such as the drill, in which the cutting edge is integrated with the main body, a part of the structure including the insert and the holder, and the holder alone, which are exemplified above, may be referred to as a tool body for the sake of convenience. The cutting tools in non-limiting aspects of the present disclosure are described in detail below by illustrating the structure including the insert and the holder.

For the sake of description, each of the drawings referred to in the following illustrates, in a simplified form, only main members necessary for describing the non-limiting aspects. Hence, the cutting tools of the present disclosure are capable of including any structural member not illustrated in the drawings referred to. Dimensions of the members in each of the drawings are not ones which faithfully represent dimensions of actual structural members and dimension ratios of these members. These points are also true for a method of manufacturing a machined product described later.

As illustrated in FIG. 1, the cutting tool 1 in a non-limiting aspect is a tool for use in a turning process which is the structure including the inert 2 and the holder 3. The cutting tool 1 may include a flow path 4 and a sealing part 5 as illustrated in FIGS. 2 to 5. Individual components of the cutting tool 1 are described sequentially below.

(Insert)

The insert 2 in a non-limiting aspect may be a plate-shaped member and may include an upper surface 21, a lower surface 22, a first end surface 23, a second end surface 24, a side surface 25, a through hole 26, and a cutting edge 27 as illustrated in FIG. 1.

The upper surface 21 and the lower surface 22 may have a quadrangular shaped (rectangular shaped) surface. The term "quadrangular shape" is a concept that may include not only a strict quadrangular shape but also those including slight irregularities or curves. The shapes of the upper surface 21 and the lower surface 22 are not limited to the quadrangular shape. These points are also true for the first end surface 23 and the second end surface 24 described later. An outer edge at a side of the side surface 25 in each of the upper surface 21 and the lower surface 22 may be taken as a long side, and an outer edge at a side of the first end surface 23 and an outer edge at a side of the second end surface 24 may be taken as a short side. At least a part of the upper surface 21 is capable of functioning as a rake surface through which chips flow during a cutting process. The terms "the upper surface 21 and the lower surface 22" may be used for the sake of convenience and do not indicate an upper direction and a lower direction, respectively. For example, the upper surface 21 need not be a surface directed upward when using the cutting tool 1.

The first end surface 23 and the second end surface 24 may be surfaces which are respectively located between the upper surface 21 and the lower surface 22, and which respectively connect to the upper surface 21 and the lower surface 22. The first end surface 23 and the second end surface 24 may be quadrangular shaped surfaces. The first end surface 23 may be the surface located at a side of a first end 3a of the holder 3 described later. At least a part of the first end surface 23 may be capable of functioning as a flank surface during the cutting process. The second end surface 24 may be the surface which is opposite to the first end surface 23 and located at a side of the second end 3b of the holder 3 described later.

The side surface 25 may be a surface which is located between the upper surface 21 and the lower surface 22 and between the first end surface 23 and the second end surface 24, and which connects to each of the upper surface 21 and the lower surface 22. The side surface 25 may be a parallelogram shaped surface. The term "parallelogram shape" is a concept including a strict parallelogram shape but also those including slight irregularities or curves. The shape of the side surface 25 is not limited to the parallelogram shape.

The insert 2 may include two side surfaces 25 in a non-limiting aspect. The through hole 26 may extend between the two side surfaces 25 in a non-limiting aspect illustrated in FIG. 1. The through hole 26 may be a portion that permits insertion of a fixing member for fixing the insert 2 to the holder 3. The fixing member may be a screw 8 in a non-limiting aspect illustrated in FIG. 1. That is, the cutting tool 1 may include the screw 8 as the fixing member. The insert 2 may be fixable to the holder 3 by inserting the screw 8 into the through hole 26 and a screw hole 341 of a pocket 34 described later (refer to FIG. 2) in this order, and by fastening them together. The fixing member may be a different fixing member instead of the screw 8. Examples of the different fixing member may include a clamp member.

The cutting edge 27 may be a portion located in at least a part of a ridge part 28 where two surfaces in the insert 2 intersect with each other. The cutting edge 27 may be located throughout the ridge part 28 where the upper surface 21 intersects with the first end surface 23 in a non-limiting aspect illustrated in FIG. 1. The insert 2 may be fixed to the holder 3 in a state in which the cutting edge 27 is protruded at a side of the first end 3a of the holder 3.

The shape of the insert 2 is not limited to that in a non-limiting aspect illustrated in FIG. 1. For example, the side surface 25 may have a triangular shape, and the first end surface 23 may connect to the second end surface 24 on the opposite side of the upper surface 21. The insert 2 may have a shape not including the lower surface 22 in a non-limiting aspect. Although the insert 2 illustrated in FIG. 1 is the plate-shaped member, there is no problem even if the insert 2 is a bar-shaped member.

For example, cemented carbide or cermet is usable as a material of the insert 2. Examples of the cemented carbide may include WC—Co, WC—TiC—Co and WC—TiC—TaC—Co. The WC—Co is produced by adding cobalt (Co) powder to tungsten carbide (WC), followed by sintering. The WC—TiC—Co may be produced by adding titanium carbide (TiC) to WC—Co. The WC—TiC—TaC—Co may be produced by adding tantalum carbide (TaC) to WC—TiC—Co. The cermet may be a sintered composite material obtainable by compositing metal into a ceramic ingredient.

Examples of the cermet may include ones which are composed mainly of a titanium compound, such as titanium carbide (TiC) and titanium nitride (TiN).

A surface of the insert 2 may be coated with a coating film. Examples of composition of the coating film may include titanium carbide (TiC), titanium nitride (TiN), titanium carbonitride (TiCN) and alumina ($Al_2O_3$). For example, a chemical vapor deposition (CVD) method or a physical vapor deposition (PVD) method is usable as a method of depositing a coating film.

Dimensions of the insert 2 are settable to, for example, the following values. A length of the long side in the upper surface 21 and the lower surface 22 may be, for example, 12-20 mm. A length of the short side in the upper surface 21 and the lower surface 22 may be, for example, 2-8 mm. A thickness from the upper surface 21 to the lower surface 22 may be, for example, 6-12 mm.

(Holder)

The holder 3 may have a shape extending from the first end 3a to the second end 3b in a non-limiting aspect as illustrated in FIG. 1. In other words, the holder 3 may have a columnar shape. The holder 3 in a non-limiting aspect illustrated in FIG. 1 may have a square column shape. The term "the square column shape" is a concept including not only a strict square column shape but also those including slight irregularities or curves. The shape of the holder 3 is not limited to the square column shape.

The holder 3 in a non-limiting aspect may include a head 32 located at a side of the first end 3a and a shank 33 located at a side of the second end 3b. The head 32 may be a portion designed to fix the insert 2 and may include an upper jaw 321 and a lower jaw 322. The shank 33 may be a portion designed to be held by a machine tool. The cutting tool 1 in a non-limiting aspect may serve for a cutting process by being attached to the machine tool with the shank 33 interposed therebetween.

Figure 2:
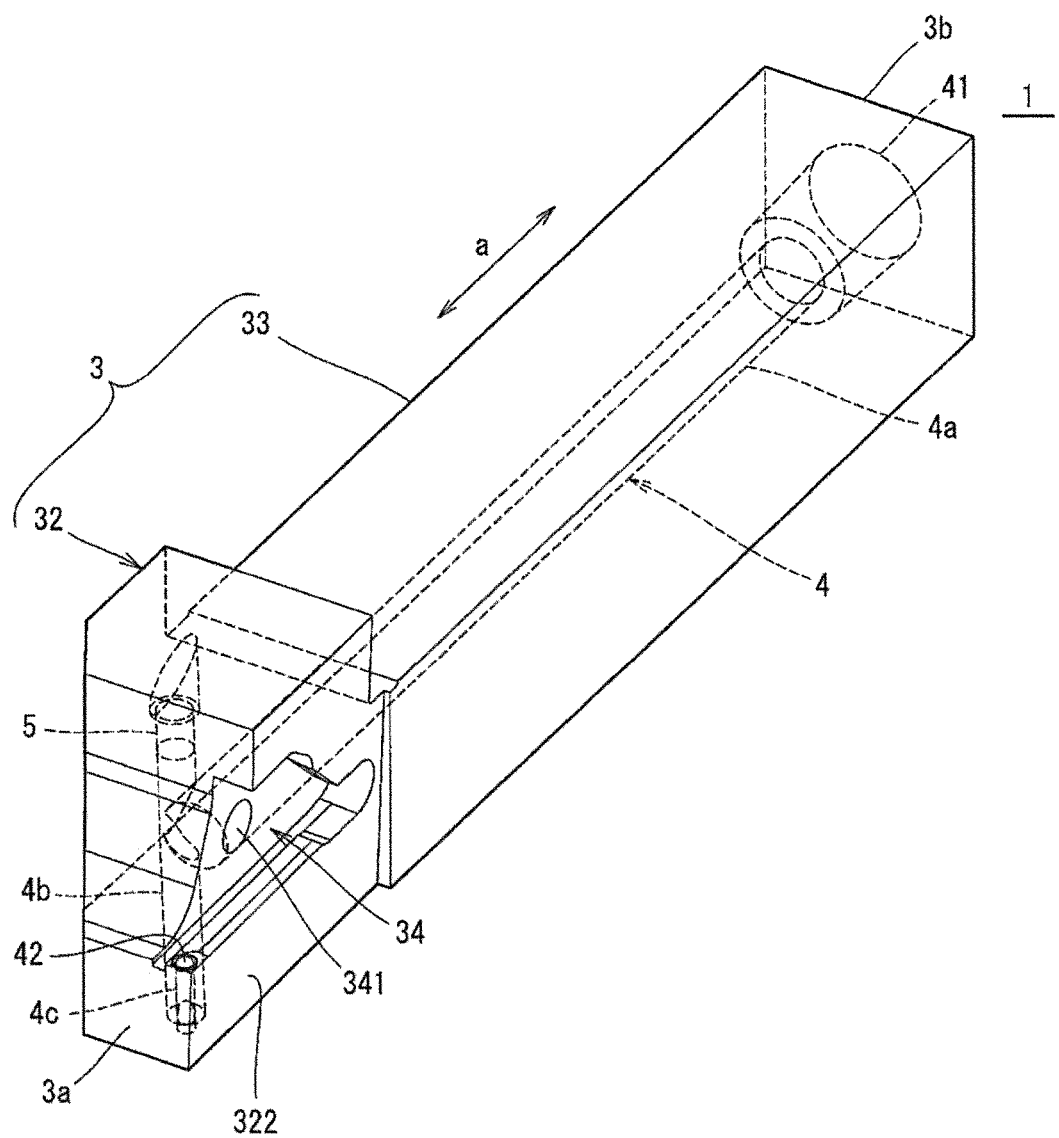
FIG. 2 is a diagram illustrating a state in which a flow path is mainly seen through after omitting an insert from FIG. 1.
Figure 3:
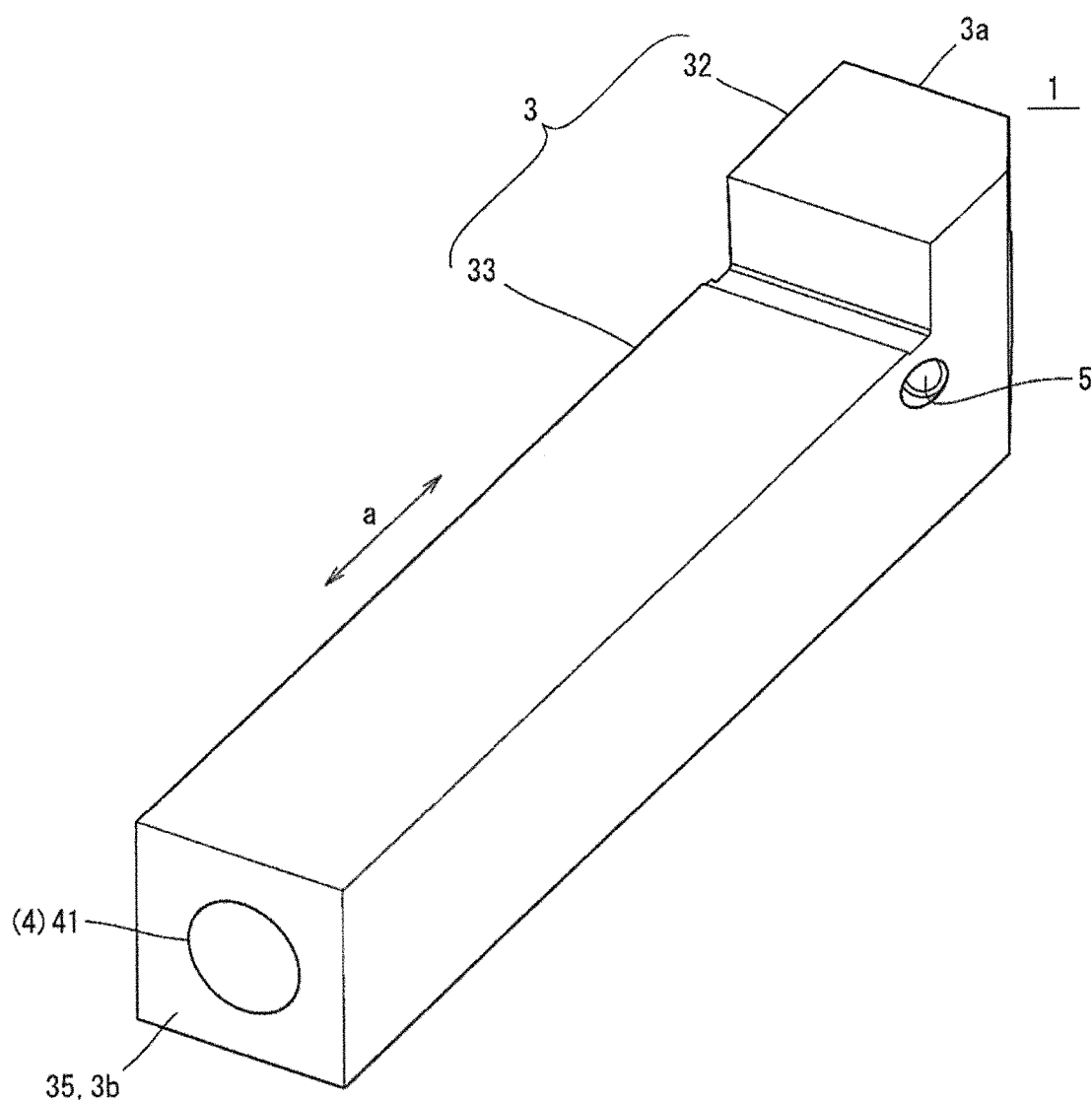
FIG. 3 is a perspective view when the cutting tool of FIG. 1 is viewed from another direction.

The holder 3 in a non-limiting aspect may include a pocket 34 located at a side of the first end 3a as illustrated in FIG. 2. The pocket 34 may be a recessed portion of the head 32 at which the insert 2 is located. The pocket 34 may include a screw hole 341 engageable with the screw 8 illustrated in FIG. 1.

For example, steel, cast iron, and aluminum alloy is usable as a material of the holder 3. Dimensions of the holder 3 are settable, for example, to the following values. A length of the holder 3 in a direction parallel to the longitudinal direction "a" is, for example, 60-200 mm. A width in a direction vertical to the longitudinal direction "a" may be, for example, 6-50 mm.

(Flow Path)

Figure 4:
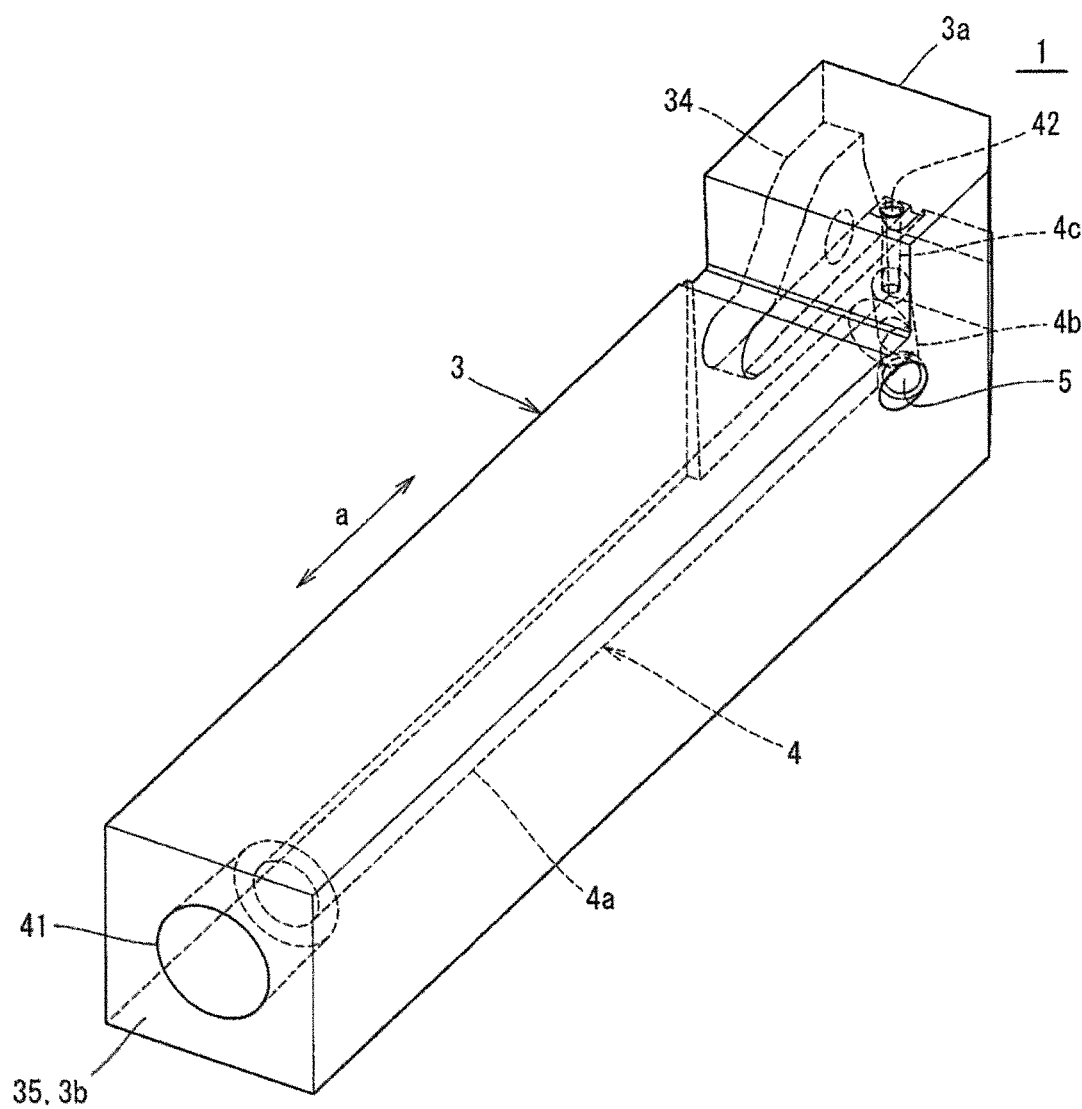
FIG. 4 is a diagram illustrating a state in which a flow path is mainly seen through after omitting the insert from FIG. 3.

As illustrated in FIGS. 2 and 4, the flow path 4 may be located inside the holder 3 and may function as a part that permits flow of a coolant (cooling fluid). In other words, the holder 3 may include the flow path 4 located therein as in a non-limiting aspect illustrated in FIGS. 2 and 4. Examples of the coolant may include water-insoluble cutting fluids and water-soluble cutting fluids. Examples of the water-insoluble cutting fluids may include oil-based cutting fluids, inert extreme pressure-based cutting fluids and active extreme pressure-based cutting fluids. Examples of the water-soluble cutting fluids may include emulsion-type, soluble-type and solution-type cutting fluids. Alternatively, the coolant may be gases, such as inert gas, instead of liquid.

The shape of the flow path 4 is not particularly limited insofar as being capable of permitting flow of the coolant. The shape of the flow path 4 in a cross section orthogonal to a flow direction of the coolant may be a circular shape in a non-limiting aspect. Alternatively, the shape of the flow path 4 in the cross section may be an elliptical shape or polygonal shape. An inner diameter of the flow path 4 may be, for example, 1-10 mm.

In a non-limiting aspect, the flow path 4 illustrated in FIGS. 2 and 4 may include a first flow path 4a, a second flow path 4b, and a third flow path 4c. In a non-limiting aspect illustrated in FIGS. 2 and 4, one end of the first flow path 4a may be an inflow port 41 described later, and one end of the third flow path 4c may be an outflow port 42 described later. An inner diameter of the first flow path 4a may be, for example, 5-10 mm. An inner diameter of the second flow path 4b may be, for example, 1-7 mm. An inner diameter of the third flow path 4c may be, for example, 0.8-6 mm. Specifically, the inner diameter of the flow path 4 in a non-limiting aspect illustrated in FIGS. 2 and 4 may decrease stepwise as going from the inflow port 41 toward the outflow port 42. If the inner diameter of the flow path 4 decreases stepwise, an injection pressure of the coolant can be enhanced efficiently.

As illustrated in FIGS. 2 and 4, the flow path 4 may include the inflow port 41 and the outflow port 42. The inflow port 41 may be a portion that allows the coolant supplied from the outside to flow into the flow path 4. The inflow port 41 in a non-limiting aspect illustrated in FIGS. 3 and 4 may open into an end surface 35 at a side of the second end 3b of the holder 3. A position into which the inflow port 41 opens is not limited to the end surface 35. For example, the inflow port 41 may open into one side surface of the holder 3. The number of the inflow ports 41 may be at least one. The inflow ports 41 may be included. If there are the inflow ports 41, the inflow port 41 to be used is selectable depending on a tool machine.

The outflow port 42 may be a portion that permits an outflow of the coolant toward the insert 2. In a non-limiting aspect, the outflow port 42 illustrated in FIGS. 1 and 2 may be located at a side of the first end 3a of the lower jaw 322 and opens so as to be opposed to the insert 2. The position into which the outflow port 42 opens is not limited to the lower jaw 322. The number of the outflow ports 42 may be at least one. The outflow ports 42 may be included. If there are the outflow ports 42, a position into which the outflow port 42 opens is settable depending on the shape of the insert 2 or the like.

(Sealing Part)

The sealing member 5 may be a portion to be sealed for against leakage of the coolant from the flow path 4. Specifically, the flow path 4 is formable, for example, by a drilling process using a drill or the like. A part of a hole formed by the drilling process, which does not function as the flow path 4, may be sealed with a sealing member in order to prevent the leakage of the coolant in a non-limiting aspect. Thus, the sealing part 5 corresponds to the part of the hole which does not function as the flow path 4, and is sealed with the sealing member. Although depending on the shape of the flow path 4, the number of the sealing parts 5 may be at least one in a non-limiting aspect. The flow paths 4 may be included. If the flow path 4 has a structure that holes to be formed by a single drilling process are coupled to each other, the holes may include openings besides the inflow port 41 and the outflow port 42. In this case, the sealing part 5 may be located at the openings other than the inflow port 41 and the outflow port 42 in a non-limiting aspect.

The flow path 4 in a non-limiting aspect may include the first flow path 4a, the second flow path 4b, and the third flow path 4c as described above. Each of the first flow path 4a, the second flow path 4b, and the third flow path 4c may be a hole part having both ends only one of which opens outward in a non-limiting aspect illustrated in FIGS. 2 and 4. One end of the first flow path 4a opening outward may correspond to the inflow port 41. One end of the third flow path 4c opening outward may correspond to the outflow port 42. One end of the second flow path 4b opening outward may correspond to neither the inflow port 41 nor the outflow port 42. Accordingly, the sealing part 5 may be located at an opening portion of the second flow path 4b in a non-limiting aspect illustrated in FIGS. 2 and 4.

Figure 5:
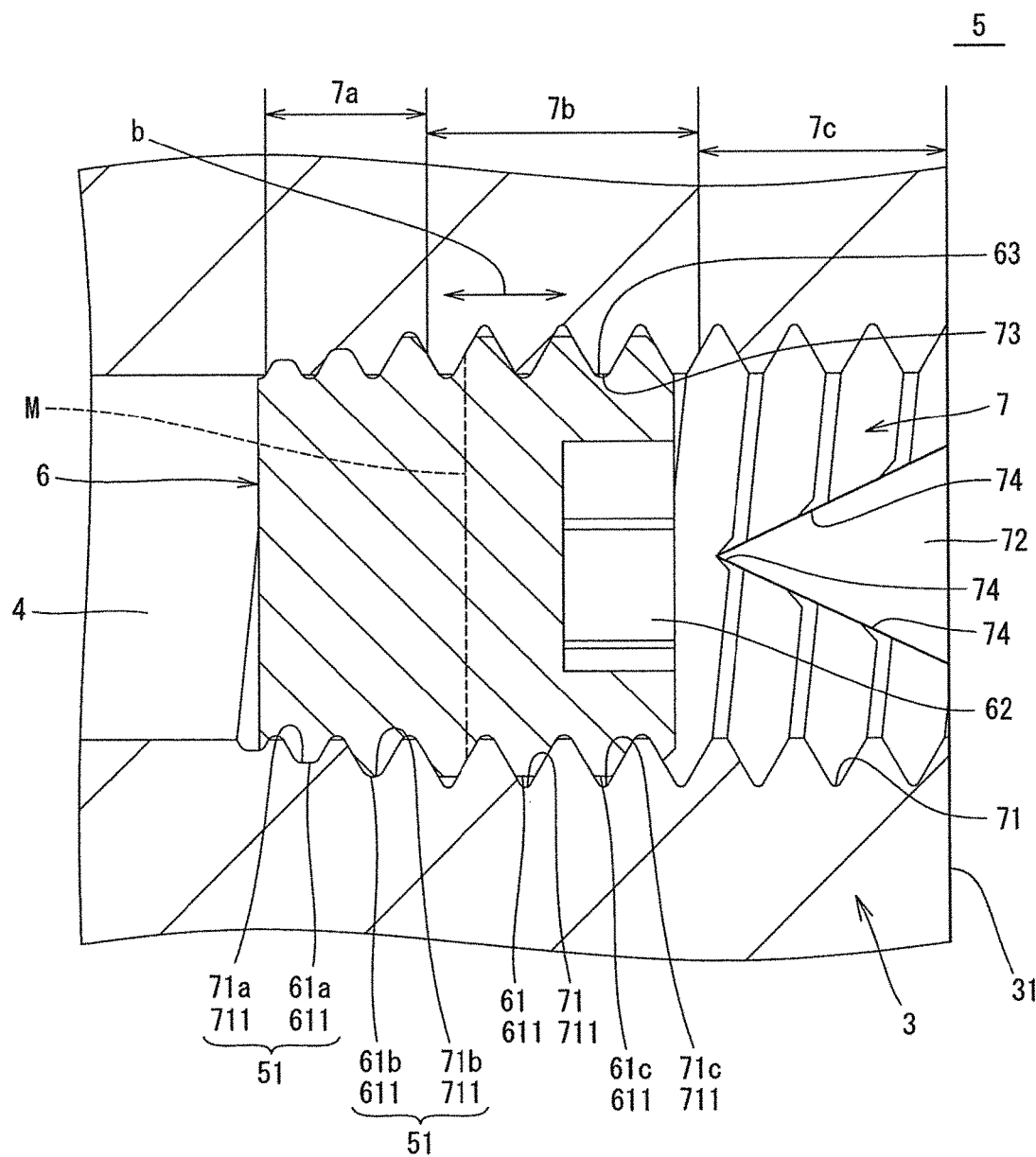
FIG. 5 is an enlarged sectional view illustrating circumstances of a sealing part in the cutting tool of FIG. 1.

The sealing part 5 may be located continuously with the flow path 4 as illustrated in FIGS. 2 and 4. The sealing part 5 may be located on an extended line of the flow path 4. In this case, the sealing part 5 may not be located on the extended line of the flow path 4. The sealing part 5 may include a male screw 6 and a female screw 7 as illustrated in FIG. 5. The male screw 6 may be attached to the female screw 7, and the male screw 6 may cooperate with the female screw 7 to function as a sealing mechanism. Here, the male screw 6 can be regarded as a non-limiting aspect of the sealing member.

Although the female screw 7 may be formed separately from the holder 3, the female screw 7 may be formed integrally with the holder 3 in a non-limiting aspect illustrated in FIG. 5. In other words, the holder 3 may include the hole part located therein and the hole part may include the flow path 4 and the female screw 7 located continuously with the flow path 4 in a non-limiting aspect.

The cutting tool 1 including the above configuration in a non-limiting aspect may be rephrased as follows. That is, the cutting tool 1 in a non-limiting aspect may include a tool body and a sealing member. The tool body may include the hole part located therein. The hole part may include the flow path 4 including the inflow port 41 and the outflow port 42, and the female screw 7 located continuously with the flow path 4. The male screw 7 that is a non-limiting aspect of the sealing member may be attached to the female screw 7. The tool body may be constituted by the insert 2, the holder 3, and the fixing member (screw 8) in a non-limiting aspect illustrated in FIG. 1. The sealing part 5 may be constituted by the female screw 7 in the tool body, and the male screw 6 that may be the sealing member in a non-limiting aspect illustrated in FIG. 5.

Figure 6:
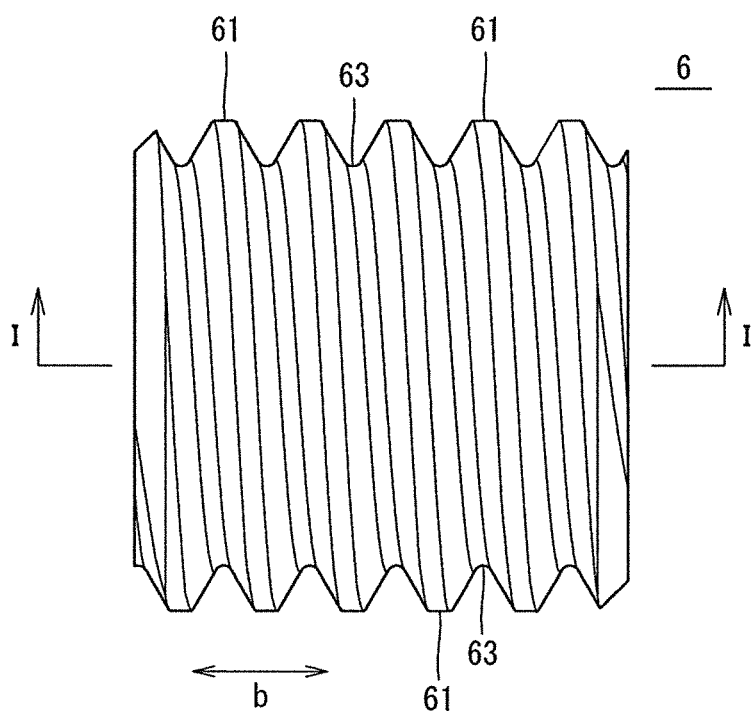
FIG. 6 is an enlarged side view illustrating a male screw in a non-limiting aspect of the present disclosure.
Figure 7:
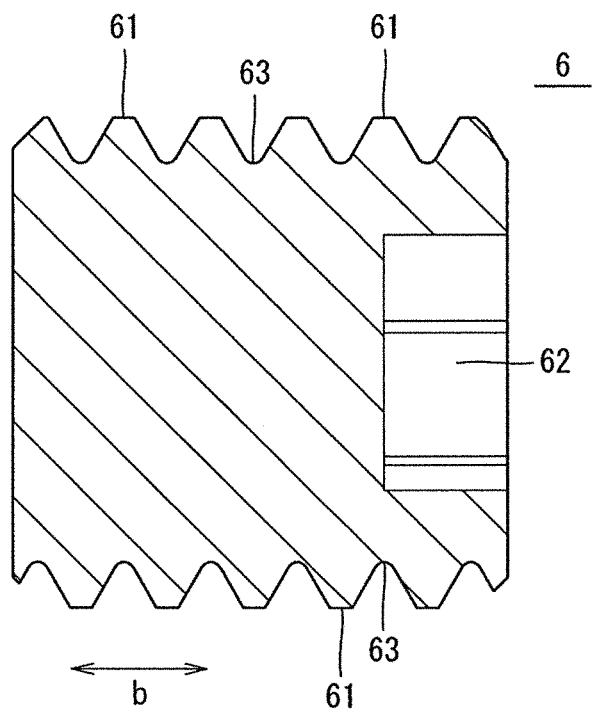
FIG. 7 is a sectional view taken along line I-I in FIG. 6.

The male screw 6 may include screw threads 61 as illustrated in FIGS. 6 and 7. The number of the screw threads 61 may be, for example, 2 to 20. A height of the screw threads 61 may be, for example, 0.1-10 mm. A distance (pitch) between the screw threads 61 adjacent to each other may be, for example, 0.1-8 mm. A length of the male screw 6 in a direction parallel to a longitudinal direction "b" may be, for example, 0.5-160 mm. An outer diameter of the male screw 6 may be, for example, 0.5-80 mm.

The male screw 6 may be, for example, a screw having a head, or a screw having no head. Examples of the screw having a head may include countersunk screws, trust screws, and low head screws. Examples of the screw having no head may include set screws. The male screw 6 may be a set screw in a non-limiting aspect illustrated in FIG. 5. In this case, the head of the male screw 6 may be less likely to interfere with an apparatus or the like during a cutting process.

Alternatively, the male screw 6 may include a recess 62 located at one end portion in the longitudinal direction "b". The recess 62 may be a portion designed to engage with a tool used when the male screw 6 is inserted into the female screw 7 and fastened together. Examples of the tool may include hexagon wrenches and screwdrivers.

Examples of material of the male screw 6 may include inorganic materials, such as metals. Examples the metals may include stainless steels and steels.

Figure 8:
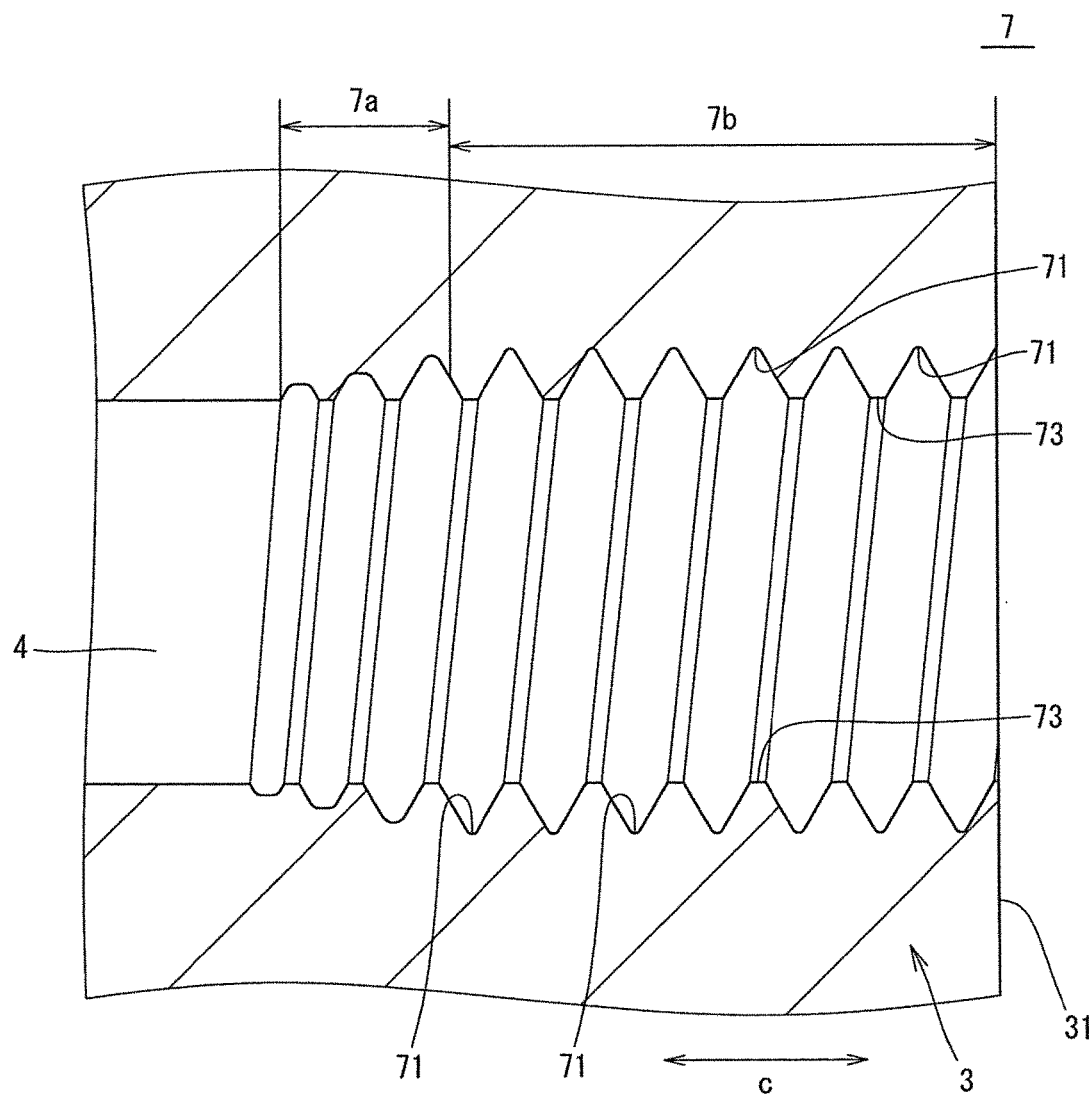
FIG. 8 is an enlarged sectional view illustrating a female screw in a non-limiting aspect of the present disclosure.

The female screw 7 may include screw grooves 71 as illustrated in FIG. 8. The number of the screw grooves 71 may be, for example, 2 to 50. A depth of the screw grooves 71 may be, for example, 0.1-10 mm. A distance between the screw grooves 71 adjacent to each other may be, for example, 0.1-8 mm. A length of the female screw 7 in a direction parallel to a longitudinal direction "c" may be, for example, 0.5-160 mm. An inner diameter of the female screw 7 may be, for example, 0.1-80 mm. The female screw 7 may be continuous with a surface 31 of the holder 3.

The sealing part 5 may include a contact portion 51 as illustrated in FIG. 5. The contact portion 51 may be a portion where at least one top portion 611 of the screw threads 61 of the male screw 6 is in contact with at least one bottom portion 711 of the screw grooves 71 of the female screw 7. In other words, the contact portion 51 may be configured so that the screw threads 61 in the male screw 6 may include a first screw thread 61a, the screw grooves 71 in the female screw 7 may include a first screw groove 71a, and the top portion 611 of the first screw thread 61a is may be contact with the bottom portion 711 of the first screw groove 71a. Because a non-limiting aspect may include the above configuration, the coolant may be less likely to leak from the sealing part 5, and the male screw 6 may be less likely to come loose by a liquid pressure of the coolant.

Specifically, severe cutting conditions have been required in recent years, and accordingly there is a tendency to enhance the liquid pressure of the coolant in order to improve a cooling function. With the configuration described above, the distance between the screw thread 61 and the screw groove 71 in the contact portion 51 can be reduced to make it easier for both to come into close contact with each other. The male screw 6 may be therefore less likely to come loose even under cutting conditions including, for example, application of liquid pressure of 1 MPa or more. The cutting tool 1 in a non-limiting aspect is consequently capable of achieving an excellent cooling function even under the severe cutting conditions.

The phrase that "the top portion 611 of the screw thread 61 is in contact with the bottom portion 711 of the screw groove 71" may denote that at least a part of the top portion 611 is in contact with at least a part of the bottom portion 711. The contact between the top portion 611 and the bottom portion 711 can be checked, for example, by observing through a microscope a cross section of the sealing part 5 as illustrated in FIG. 5.

A state in which the top portion 611 is in contact with the bottom portion 711 can be established, for example, in the following manner. The female screw 7 may include a first incomplete thread portion 7a in a non-limiting aspect. The screw thread 61 of the male screw 6 may be subjected to plastic deformation along the screw groove 71 of the first incomplete thread portion 7a of the female screw 7 by inserting the male screw 6 into the female screw 7, and by fastening the male screw 6 against the first incomplete thread portion 7a of the female screw 7 in a non-limiting aspect. In other words, the contact portion 51 may be constituted by an incomplete thread portion of the male screw 6 and the first incomplete thread portion 7a of the female screw 7.

The term "incomplete thread portion" may be, for example, a portion not having a complete thread shape as prescribed in JIS B 0176-1:2002. A complete thread portion described later may be, for example, a portion having a complete thread shape as prescribed in JIS B 0176-1:2002. However, the complete thread shape need not have a strictly constant height of a screw thread but may include slight variations. Specifically, there may be an approximately 5% difference between one having a greatest height and one having a lowest height among the screw threads. Similarly, the complete thread shape need not have a strictly constant pitch of the screw threads and a strictly constant angle of the screw threads, each of which may have an approximately 5% variation.

One configuration of the first incomplete thread portion 7a of the female screw 7 may be, for example, one in which a distance between the screw grooves 71 adjacent to each other is smaller than that in the complete thread portion. Another configuration of the first incomplete thread portion 7a of the female screw 7 may be, for example, one in which a depth of the screw groove 71 is smaller than that in the complete thread portion.

A filler may be loaded into a portion of the sealing part 5 with which neither the male screw 6 nor the female screw 7 is in contact, namely, a clearance between the male screw 6 and the female screw 7. If the filler is loaded therein, the coolant may be much less likely to leak from the sealing part 5, and the male screw 6 may be much less likely to come loose by the liquid pressure of the coolant. Particularly, if the filler is an adhesive, the male screw 6 may be much less likely to come loose by the liquid pressure of the coolant. Examples of the adhesive may include organic adhesives, such as epoxy resins, acrylic resins and silicone rubbers.

Although the height of the screw thread 61 in the male screw 6 may be kept constant, for example, the height of the screw thread 61 in the contact portion 51 may be smaller than a height of the screw thread 61 in portions other than the contact portion 51. In other words, a height of the first screw thread 61a may be smaller than a height of screw threads 61 except for the first screw thread 61a in the male screw 6. If a height of the first screw thread 61a located at the contact portion 51 is relatively low, an outer diameter of the contact portion 51 can be made relatively small. Hence, the coolant may be much less likely to leak from the sealing part 5.

The contact portion 51 is not limited to a specific position in the sealing part 5. The contact portion 51 may be located at a side close to the flow path 4 in the sealing part 5, or may be located at a side farther from the flow path 4. The contact portion 51 is located at the side close to the flow path 4 in the sealing part in a non-limiting aspect illustrated in the drawings. In other words, the first screw thread 61a is located at the side close to the flow path 4 in the male screw 6. If the first screw thread 61a is located at the side close to the flow path 4 in the male screw 6, it is easy to attach the male screw 6 to the female screw 7, while it is possible to stably form the contact portion 51.

The phrase that "the side close to the flow path 4 in the sealing part 5" may denote at least a region closer to the flow path 4 than a midportion M of the male screw 6 in a direction "b" along a shaft of the male screw 6 (a longitudinal direction). The phrase that "the side farther from the flow path 4 in the sealing part 5" may denote at least a region farther from the flow path 4 than the midportion M of the male screw 6 in the direction "b" along the shaft of the male screw 6.

The top portion 611 of the screw thread 61 located closest to the side of the flow path 4 among the screw threads 61 in the male screw 6 may be in contact with the bottom portion 711 of the screw groove 71 located closest to the flow path 4 among the screw grooves 71 of the female screw 7 in the contact portion 51. That is, the first screw thread 61a may be located at a side closest to the flow path 4 among the screw threads 61 in the male screw 6. If the first screw thread 61a is located as described above, the coolant may be less likely to enter the sealing part 5.

The contact portion 51 may be configured so that two or more top portions 611 of the screw threads 61 of the male screw 6 may respectively be in contact with two or more bottom portion 711 of the screw threads 71 of the female screw 7. In other words, the screw threads 61 may further include a second screw thread 61b located farther from the flow path 4 than the first screw thread 61a, the screw grooves 71 may further include a second screw groove 71b located farther from the flow path 4 than the first screw groove 71a, and the top portion 611 of the second screw thread 61b may be in contact with a bottom portion 711 of the second screw groove 71b. If the cutting tool 1 includes the above configuration, the effect obtained by the contact portion 51 can be enhanced, and the male screw 6 may be therefore much less likely to come loose by the liquid pressure.

In cases where the screw threads 61 in the male screw 6 include the second screw thread 61b, a height of the second screw thread 61b is not limited to a specific value. For example, the height of the second screw thread 61b may be smaller than a height of the screw threads 61 except for the first screw thread 61a and the second screw thread 61b in the male screw 6, and the height of the first screw thread 61a may be smaller than the height of the second screw thread 61b. If the height of the second screw thread 61b is smaller than the height of the screw threads 61 except for the first screw thread 61a and the second screw thread 61b in the male screw 6, the outer diameter of the contact portion 51 can be made relatively small. If the height of the first screw thread 61a is smaller than the height of the second screw thread 61b, it may become easier to attach the male screw 6 to the female screw 7.

The sealing part 5 may include the contact portion 51 as illustrated in FIG. 5. The entirety of the sealing part 5 may constitute the contact portion 51, or alternatively, a part of the sealing part 5 may constitute the contact portion 51. In other words, all of the top portions 611 in the screw threads 61 may respectively be in contact with the bottom portions 711 of the screw grooves 71 in the female screw 7. Alternatively, only a part of the top portions 611 in the screw threads 61 may be in contact with the bottom portions 711 of the screw grooves 71 in the female screw 7.

A part of the top portions 611 in the screw threads 61 may be kept away from the bottom portions 711 in the female screw 7 in a non-limiting aspect illustrated in FIG. 5. In other words, the screw threads 61 may further include a third screw thread 61c located farther from the flow path 4 than the first screw thread 61a and the second screw thread 61b, and the screw grooves 71 may further include a third screw groove 71c opposed to the third screw thread 61c, and the top portion 611 of the third screw thread 61c may be kept away from the bottom portion 711 of the third screw groove 71c in a non-limiting aspect illustrated in FIG. 5. If the cutting tool 1 includes the third screw thread 61c and the third screw groove 71c as described above, it may be easy to attach the male screw 6 to the female screw 7, while it is possible to stably form the contact portion 51.

Hardness of the female screw 7 may be higher than hardness of the male screw 6. With this configuration, when the male screw 6 is inserted into the female screw 7 and fastened together, the screw threads 61 of the male screw 6 may be subjected to plastic deformation and crushed along the screw groove 71 of the female screw 7, thereby forming the contact portion 51. Thus, the male screw 6 and the female screw 7 in the contact portion 51 may become the incomplete thread portions, and the male screw 6 may be therefore less likely to rotate in a loosening direction. If the hardness of the female screw 7 is higher than the hardness of the male screw 6, the female screw 7 may be less likely to be subjected to plastic deformation than the male screw 6. The inner diameter of the female screw 7 may be therefore less likely to expand when attaching the male screw 6 to the female screw 7. Thus, because the outer diameter of the contact portion 51 is less likely to increase, the coolant may be much less likely to leak from the sealing part 5.

The female screw 7 may be, for example, 340-610 in Vickers hardness (hereinafter also referred to as "HV"). The male screw 6 may be, for example, 200-280 in HV. A difference between the HV of the female screw 7 and the HV of the male screw 6 may be, for example, 100-220. These HV values are measurable according to JIS Z 2244:2009.

Like a non-limiting aspect illustrated in FIG. 5, the top portion 611 of the first screw thread 61a may be in contact with the bottom portion 711 of the first screw groove 71a, while a base bottom portion 63 of the screw threads 61 in the male screw 6 may be kept away from an edge portion 73 of the screw grooves. If the hardness of the female screw 7 is higher than the hardness of the male screw 6, durability of the male screw 6 can be improved because the base bottom portion 63 is kept away from the edge portion 73.

The entirety of the male screw 6 may be located inside the female screw 7. With this configuration, good operability may be ensured when attaching the holder 3 to a tool machine, and the male screw 6 may be less likely to interfere with an apparatus or the like during a cutting process.

The sealing part 5 may further include a second incomplete thread portion 7c located at a more outward region than the contact portion 51 in the female screw 7. In other words, the sealing part 5 may further include the second incomplete thread portion 7c located at a region closer to a side of the surface 31 of the holder 3 than the contact portion 51 in the female screw 7. With this configuration, the second incomplete thread portion 7c may function as a stopper, and therefore, even if the male screw 6 comes loose, the male screw 6 may be less likely to further come loose by the second incomplete thread portion 7c. The second incomplete thread portion 7c may be located, for example, over two or more screw grooves 71.

The second incomplete thread portion 7c is not limited to a specific configuration. For example, a distance between the screw grooves 71 adjacent to each other in the second incomplete thread portion 7c may be made smaller than a distance between the screw grooves 71 adjacent to each other in the incomplete thread portion 7b. In a non-limiting aspect illustrated in FIG. 5, the screw grooves 71 located at the second incomplete thread portion 7c may include at least one protrusion 74. A non-limiting aspect illustrated in FIG. 5 may include protrusions 74. If the second incomplete thread portion 7c includes the protrusion 74, the protrusion 74 may function as a stopper.

Specifically, if the protrusion 74 is protruded toward the flow path 4, the male screw 6 may be much less likely to come loose by the protrusion 74. For example, the flow path 4 may be located on a left side relative to the second incomplete thread portion 7c, and the protrusion 74 may be protruded leftward from a right side in a non-limiting aspect illustrated in FIG. 5. The male screw 6 may be subjected to a pressing force by the liquid pressure of the coolant. The male screw 6 may be subjected to a pressing force from the left side toward the right side in a non-limiting aspect illustrated in FIG. 5. Therefore, even if the male screw 6 comes loose, the male screw 6 may be designed to be pressed against the protrusion 74. The male screw 6 may be therefore much less likely to come loose by the protrusion 74.

If the female screw 7 in the sealing part 5 is arranged so that the second incomplete thread portion 7c, the complete thread portion 7b and the first incomplete thread portion 7c may be located in this order from the side of the surface 31 of the holder 3, the complete thread portion 7b may be held between the first incomplete thread portion 7a and the second incomplete thread portion 7c. The male screw 6 may be consequently much less likely to come loose in the sealing part 5.

The second incomplete thread portion 7c may be formed, for example, by inserting the male screw 6 into the female screw 7 and fastening together, and thereafter by deforming the screw groove 71 of the female screw 7 located more outward than the contact portion 51. The deformed part (hereinafter referred to as "the deformed portion" for the sake of convenience) in the screw groove 71 may be formed entirely or partially on an inner peripheral surface of the female screw 7 serving as the second incomplete thread portion 7c. If the deformed portion of the screw groove 71 is formed entirely on the inner peripheral surface of the female screw 7, for example, a circular column-shaped tool may be press-fitted into the female screw 7. If the deformed portion of the screw groove 71 is formed partially on the inner peripheral surface of the female screw 7, for example, a part of the screw groove 71 may be cut out by a bar-shaped tool. That is, as illustrated in FIG. 5, the second incomplete thread portion 7c may include a cutout portion 72 formed by cutting out a part of the screw groove 71.

With the above configuration, it may become easier to form the sealing part 5. That is, when inserting the male screw 6 into the female screw 7, the male screw 6 may be firstly engaged with the incomplete thread portion 7b of the female screw 7 (refer to FIG. 8). Thereby, shaft misalignment may be less likely to occur when inserting the male screw 6, thus leading to a smooth insertion of the male screw 6 into the female screw 7. If the hardness of the female screw 7 is higher than the hardness of the male screw 6, the screw thread 61 of the male screw 6 can be subjected to plastic deformation along the screw groove 71 of the female screw 7 by inserting the male screw 6 up to the first incomplete thread portion 7a, and by fastening together as described above. This may make it easier to form the contact portion 51 of the sealing part 5.

A part of the complete thread portion used during insertion of the male screw 6 may become the second incomplete thread portion 7c and the rest becomes the complete thread portion 7b by inserting the male screw 6 into the female screw 7 and fastening together, and thereafter, by deforming the screw groove 71 of the female screw 7 located more outward than the contact portion 51 (refer to FIGS. 5 and 8).

<Method of Manufacturing Machined Product>

Methods of manufacturing a machined product according to non-limiting aspects of the present disclosure are described in detail below with reference to FIGS. 9 to 11.

Figure 9:
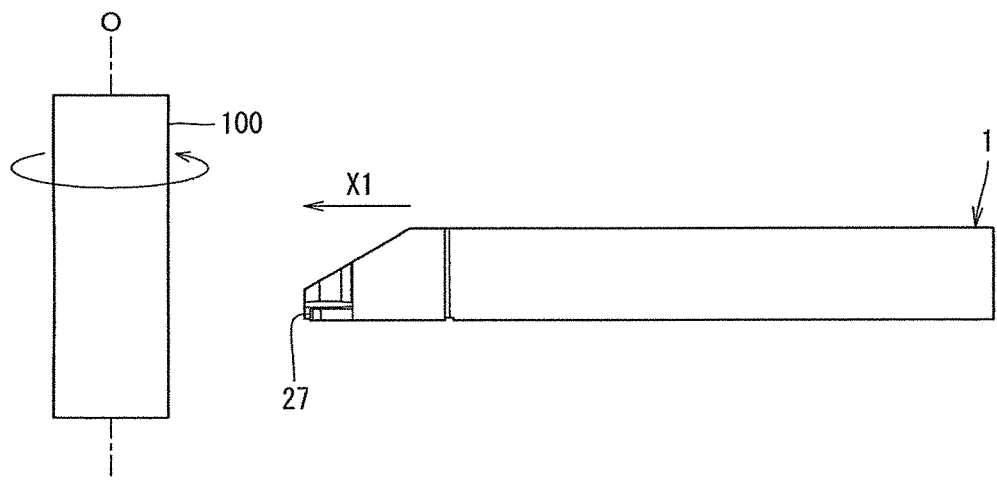
FIG. 9 is a schematic diagram illustrating a step in a method of manufacturing a machined product in a non-limiting aspect of the present disclosure.
Figure 10:
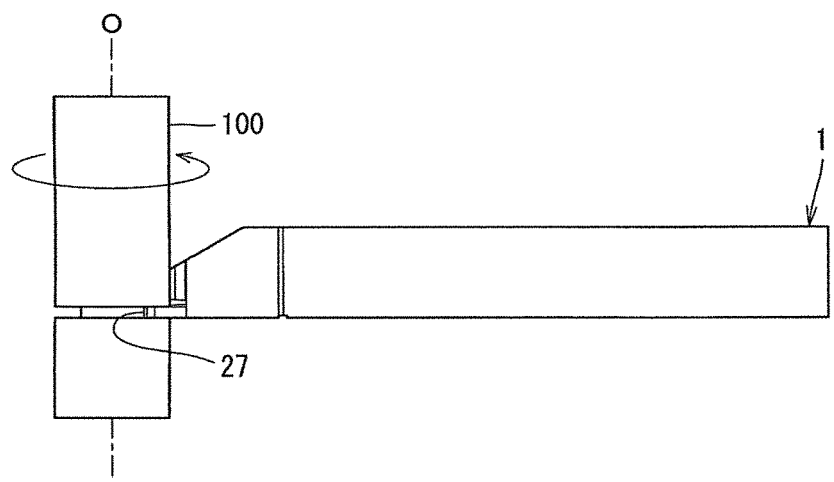
FIG. 10 is a schematic diagram illustrating a step in the method of manufacturing a machined product in a non-limiting aspect of the present disclosure.
Figure 11:
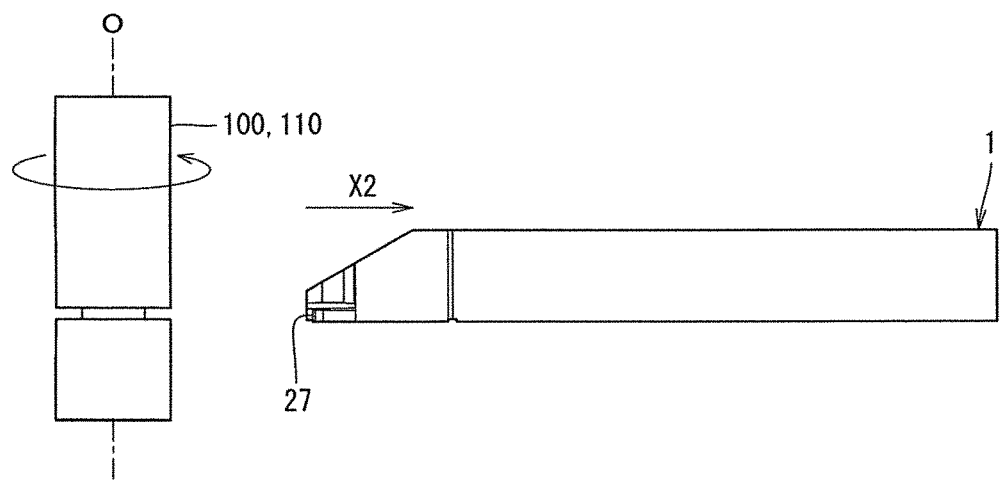
FIG. 11 is a schematic diagram illustrating a step in the method of manufacturing a machined product in a non-limiting aspect of the present disclosure.

The method of manufacturing a machined product in a non-limiting aspect of the present disclosure may include the following steps of:

(1) preparing a workpiece 100 and the cutting tool 1 as illustrated in FIG. 9;

(2) rotating the workpiece 100 or the cutting tool 1;

(3) causing the workpiece 100 and the cutting tool 1 to come into contact with each other as illustrated in in FIG. 10; and (4) keeping the workpiece 100 and the cutting tool 1 away from each other as illustrated in FIG. 11.

Specifically, examples of material of the workpiece 100 prepared in the step (1) may include carbon steel, alloy steel, stainless steel, cast iron and nonferrous metals. In a non-limiting aspect illustrated in FIG. 9, the cutting tool 1 described above in the step (1) may be prepared.

In the step (2), the workpiece 100 may be rotated around a rotation axis O of the workpiece 100 as illustrated in FIG. 9.

In the step (3), firstly, the cutting tool 1 may be relatively brought near the workpiece 100 being rotated by moving the cutting tool 1 in an arrowed direction X1. Subsequently, the workpiece 100 may be cut out by causing the workpiece 100 and the cutting edge 27 of the cutting tool 1 to come into contact with each other as illustrated in FIG. 10. Here, the workpiece 100 may be cut out while causing the coolant to flow out from the outflow port 42.

In the step (4), the workpiece 100 and the cutting tool 1 may be kept away from each other to obtain a machined product 110 by moving the cutting tool 1 in an arrowed direction X2 as illustrated in FIG. 11.

With the method of manufacturing a machined product in a non-limiting aspect, the use of the cutting tool 1 makes it possible to carry out a cutting process under cutting conditions involving a high coolant pressure. It is consequently possible to obtain the machined product 110 having a highly accurate machined surface.

Alternatively, the cutting tool 1 may be rotated in the step (2). The workpiece 100 may be brought near the cutting tool 1 in the step (3). The workpiece 100 may be kept away from the cutting tool 1 in the step (4). If the cutting process is continued, it is necessary to repeat the step of bringing the cutting edge 27 into contact with different portions of the workpiece 100, while the workpiece 100 is kept rotating.

While the cutting tools 1 and the methods of manufacturing the machined product 110 in a non-limiting aspect of the present disclosure have been exemplified above. It is, of course, possible to make any arbitrary ones in so far as they do not depart from the gist of the present disclosure.

For example, even though the cutting tools 1 are the tools for use in the turning process in the above non-limiting aspect, the cutting tools 1 may be alternatively tools for use in a milling process.

Although in the foregoing description, the entirety of the male screw 6 may be located inside the female screw 7 in the above non-limiting aspect, a part of the male screw 6 may be exposed from the female screw 7.

Singular forms "a", "an" and "the" in the entirety of the present disclosure include plural forms thereof unless clearly indicated not being so from the context.

DESCRIPTION OF THE REFERENCE NUMERALS 1 cutting tool
2 insert
   21 upper surface
   22 lower surface
   23 first end surface
   24 second end surface
   25 side surface
   26 through hole
   27 cutting edge 28 ridge part
3 holder
  3a first end
  3b second end
  31 surface
  32 head
    321 upper jaw
    322 lower jaw
  33 shank
  34 pocket
    341 screw hole
  35 end surface
4 flow path
  41 inflow port
  42 outflow port
  4a first flow path
  4b second flow path
  4c third flow path
5 sealing part
  51 contact portion
6 male screw
  61 screw thread
  61a first screw thread
  61b second screw thread
  61c third screw thread
    611 top portion
  62 recess
  63 base bottom portion
7 female screw
  71 screw groove
  71a first screw groove
  71b second screw groove
  71c third screw groove
    711 bottom portion
  72 cutout portion
  73 edge portion
  74 protrusion
  7a first incomplete thread portion
  7b complete thread portion
  7c second incomplete thread portion
8 screw
100 workpiece
110 machined product

What is claimed is:

1. A cutting tool, comprising:
a flow path comprising an inflow port and an outflow port; and
a sealing part located continuously with the flow path and comprising a male screw and a female screw,
wherein
screw threads in the male screw comprise a first screw thread, a second screw thread located farther from the flow path than the first screw thread, and a third screw thread located farther from the flow path than the first screw thread and the second screw thread;
screw grooves in the female screw comprise a first screw groove, a second screw groove located farther from the flow path than the first screw groove, a third screw groove aligned with the third screw thread;
a top portion of the first screw thread is in contact with a bottom portion of the first screw groove, a top portion of the second screw thread is in contact with a bottom portion of the second screw groove, and a top portion of the third screw thread is separated by a gap from a bottom portion of the third screw groove; and
a height of the second screw thread is smaller than a height of the screw threads, a height of the first screw thread is smaller than the height of the second screw thread, and the height of the screw threads excludes the height of the first screw thread and the height of the second screw thread.

2. The cutting tool according to claim 1, wherein a height of the first screw thread is smaller than a height of the screw threads, the height of the screw threads excluding the height of the first screw thread.

3. The cutting tool according to claim 1, wherein the first screw thread is located at a side close to the flow path in the male screw.

4. The cutting tool according to claim 3, wherein the first screw thread is located closest to the flow path among the screw threads in the male screw.

5. The cutting tool according to claim 1, wherein hardness of the female screw is higher than hardness of the male screw.

6. The cutting tool according to claim 5, wherein a base bottom portion of the screw threads is separated by a gap from an edge portion of the screw grooves.

7. The cutting tool according to claim 1, wherein the male screw is a set screw.

8. The cutting tool according to claim 7, wherein the male screw is located entirely inside the female screw.

9. The cutting tool according to claim 8, wherein the female screw in the sealing part further comprises an incomplete thread portion located at a more outward region than the male screw.

10. The cutting tool according to claim 9, wherein the screw grooves located in the incomplete thread portion comprise at least one protrusion.

11. The cutting tool according to claim 10, wherein the protrusion is protruded toward the flow path.

12. A method of manufacturing a machined product, comprising:
preparing a workpiece and the cutting tool according to claim 1;
rotating the workpiece or the cutting tool;
causing the workpiece and the cutting tool to come into contact with each other; and
keeping the workpiece and the cutting tool away from each other.

13. A cutting tool, comprising:
a flow path comprising an inflow port and an outflow port; and
a sealing part located continuously with the flow path and comprising a male screw that is a set screw and a female screw,
wherein
screw threads in the male screw comprise a first screw thread,
screw grooves in the female screw comprise a first screw groove,
a top portion of the first screw thread is in contact with a bottom portion of the first screw groove,
the male screw is located entirely inside the female screw,
the female screw in the sealing part further comprises an incomplete thread portion located at a more outward region than the male screw, and
the screw grooves located in the incomplete thread portion comprise at least one protrusion protruding toward the flow path.

14. The cutting tool according to claim 13, wherein
the screw threads further comprise a second screw thread located farther from the flow path than the first screw thread,
the screw grooves further comprise a second screw groove located farther from the flow path than the first screw groove, and
a top portion of the second screw thread is in contact with a bottom portion of the second screw groove.

15. The cutting tool according to claim 14, wherein
a height of the second screw thread is smaller than a height of the screw threads
a height of the first screw thread is smaller than the height of the second screw thread, and
the height of the screw threads excludes the height of the first screw thread and the height of the second screw thread.

16. The cutting tool according to claim 15, wherein
the screw threads further comprise a third screw thread located farther from the flow path than the first screw thread and the second screw thread,
the screw grooves further comprise a third screw groove aligned with the third screw thread, and
a top portion of the third screw thread is separated by a gap from a bottom portion of the third screw groove.

17. A cutting tool, comprising:
a flow path comprising an inflow port and an outflow port; and
a sealing part located continuously with the flow path and comprising a male screw that is a set screw and a female screw,
wherein
screw threads in the male screw comprise a first screw thread,
screw grooves in the female screw comprise a first screw groove,
a top portion of the first screw thread is in contact with a bottom portion of the first screw groove,
the female screw in the sealing part further comprises an incomplete thread portion, and
the screw grooves located in the incomplete thread portion comprise at least one protrusion protruding toward the flow path.

18. The cutting tool according to claim 17, wherein
the screw threads further comprise a second screw thread located farther from the flow path than the first screw thread,
the screw grooves further comprise a second screw groove located farther from the flow path than the first screw groove, and
a top portion of the second screw thread is in contact with a bottom portion of the second screw groove.

19. The cutting tool according to claim 18, wherein
a height of the second screw thread is smaller than a height of the screw threads
a height of the first screw thread is smaller than the height of the second screw thread, and
the height of the screw threads excludes the height of the first screw thread and the height of the second screw thread.

20. The cutting tool according to claim 19, wherein
the screw threads further comprise a third screw thread located farther from the flow path than the first screw thread and the second screw thread,
the screw grooves further comprise a third screw groove aligned with the third screw thread, and
a top portion of the third screw thread is separated by a gap from a bottom portion of the third screw groove.

\* \* \* \* \*